United States Patent [19]

Dorsch

[11] 4,091,620
[45] May 30, 1978

[54] SUPERCHARGED INTERNAL COMBUSTION ENGINE

[75] Inventor: Heinz Dorsch, Leonberg, Germany

[73] Assignee: Dr. Ing. h.c.F. Porsche Aktiengesellschaft, Germany

[21] Appl. No.: 724,270

[22] Filed: Sep. 17, 1976

[30] Foreign Application Priority Data

Sep. 17, 1975 Germany .............................. 2541371

[51] Int. Cl.² ...................... F02B 37/00; F02B 33/44
[52] U.S. Cl. ........................................ 60/606; 60/619
[58] Field of Search ................ 60/600, 602, 605, 606, 60/614, 619, 601, 603

[56] References Cited

U.S. PATENT DOCUMENTS

| | | | |
|---|---|---|---|
| 2,173,595 | 9/1939 | Schutte | 60/606 |
| 3,673,797 | 7/1972 | Wilkinson | 60/600 |

Primary Examiner—Carlton R. Croyle
Assistant Examiner—L. J. Casaregola
Attorney, Agent, or Firm—Craig & Antonelli

[57] ABSTRACT

A supercharged internal combustion engine having an exhaust gas turbocharger which includes an exhaust gas turbine and a charging blower driven by the exhaust gas turbine. A secondary air pump is associated with the internal combustion engine for afterburning of the exhaust gases with a regulating valve, controlled by the combustion air pressure, being effective to supply secondary air from the secondary air pump into either the exhaust gas line upstream of the exhaust gas turbine or discharging of the secondary air into the atmosphere in dependence upon the combustion air pressure.

11 Claims, 1 Drawing Figure

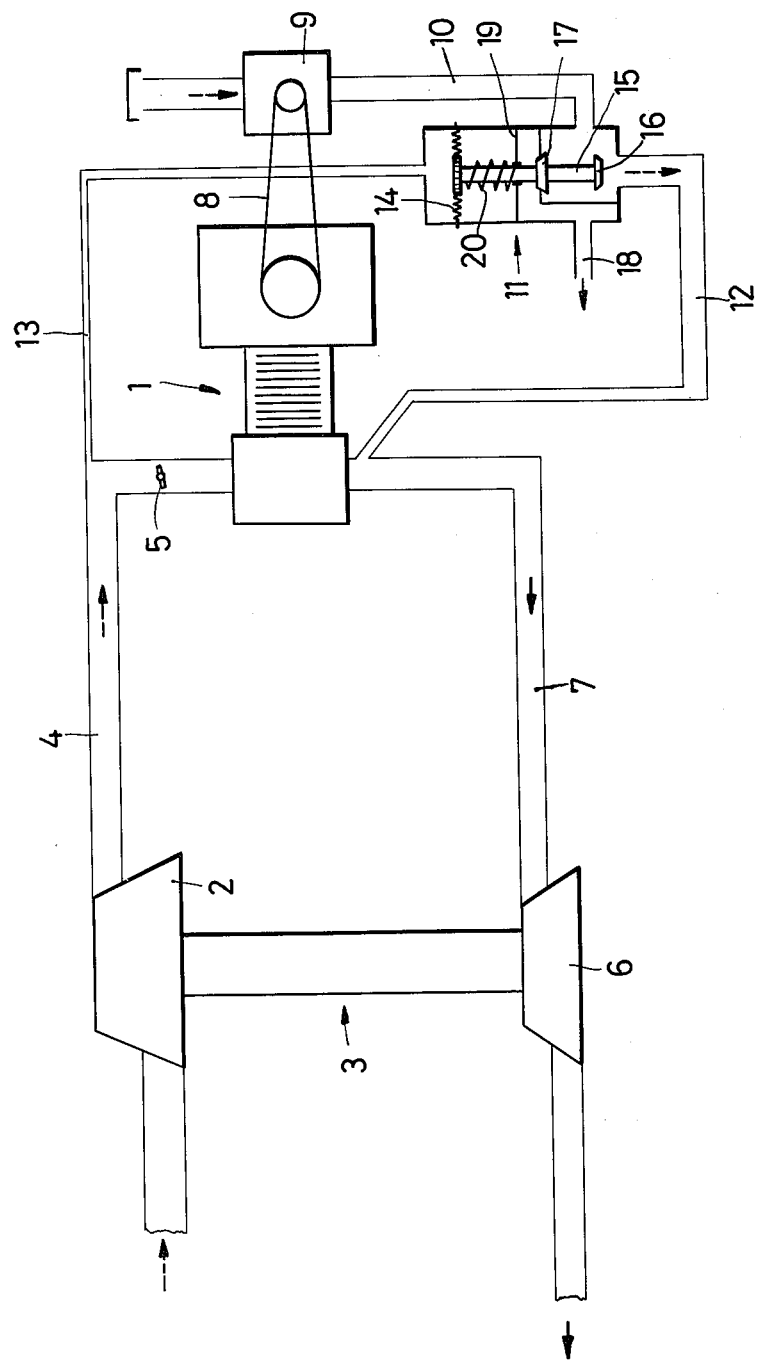

SUPERCHARGED INTERNAL COMBUSTION ENGINE

The present invention relates to a supercharged internal combustion engine having an exhaust gas turbocharger which includes an exhaust gas turbine driving an air charging blower whereby combustion air is supplied to the internal combustion engine from the charging blower by way of a charging air line with the exhaust gases of the internal combustion engine being supplied by way of an exhaust line to the exhaust gas turbine, and with a secondary air pump being operatively associated with the internal combustion engine to provide for an afterburning of the exhaust gases.

A supercharged internal combustion engine having an exhaust gas turbocharger including a charging blower and exhaust gas turbine has been proposed, for example, in German Auslegeschrift No. 2,021,663 wherein an afterburning chamber is connected to an exhaust turbine to which additional air is supplied for afterburning of the exhaust gases with the supplementary air being drawn in from the atmosphere by a jet pump. The aim of this proposed arrangement is to remove the poisonous combustible components of carbon monoxide and hydrocarbons in the exhaust gas of the internal combustion engine by way of an afterburning; however, such proposed arrangement has no effect on the output of the exhaust gas turbine.

The present invention is concerned with the task of providing a structurally simple supercharged internal combustion engine which operates reliably while eliminating the shortcomings encountered in the prior art.

The underlying problems are solved in accordance with the present invention by providing an exhaust gas turbocharger which includes a charging blower and exhaust gas turbine, and a secondary air pump which provides a supply of secondary air utilized in such a manner for afterburning the harmful components in the exhaust gas of the internal combustion engine while, at the same time, increasing and optimizing the output of the exhaust gas turbine at each operating condition or load range of the internal combustion engine.

According to one feature of the present invention, a blow-off or change-over valve is arranged in a secondary air line which communicates with the exhaust line upstream of the exhaust gas turbine. The change-over valve is responsive to air pressure in the charging air line so as to effect a supply of secondary air into the exhaust gas line or a discharge of the secondary air into the atmosphere in dependence upon the combustion air pressure in the charging air line.

According to a further feature of the present invention, the blow-off or change-over valve is fashioned as a double-sided, double-acting cone valve operating associated with a pressure responsive element or membrane acted upon and responsive to the combustion air pressure in the charging air line. One of the valve cones or disks of the double-acting valve is arranged so as to control a secondary air line for discharging secondary air into the exhaust gas line with the other valve cone or disk controlling a further secondary air line for discharging secondary air into the atmosphere. The positions of the cone valve are influenced by a compression spring which acts upon the pressure responsive element so as to urge the same against the combustion air pressure.

One advantage of the present invention resides in the fact that harmful hydrocarbons and carbon monoxide in the exhaust gas of the internal combustion engine are burned or combusted ahead or upstream of the exhaust gas turbine with the oxygen required for such combustion being supplied by the secondary air pump.

Since internal combustion engines are operated at a full load with a few percent of carbon monoxide per volume of combustible material and since the combustion of 1 percent of carbon monoxide results in an increase in the exhaust gas temperature of about 50° C., the temperature of the exhaust gases delivered to the exhaust gas turbocharger can be increased by a few hundred degrees centigrade, with the increase being determined by the percent of carbon monoxide present in the combustible material. The thermal energy of the exhaust gas turbine converted into mechanical energy increases in about the same ratio as the absolute gas temperature increases, that is, the exhaust gas turbine and charging air blower rotative speeds are increased.

With an equal rotative speed of the internal combustion engine and the exhaust gas turbine, the air charge increases due to the existence of higher charging pressures, whereby the torque of the internal combustion engine of the present invention is increased as compared with a conventional internal combustion engine without a secondary air governing control arrangement at equal rotative speeds, as proposed by the instant invention.

Since the exhaust gas temperature increases with an increasing rotative speed of the internal combustion engine, the allowable temperature increase will be smaller due to the afterburning of harmful components in the exhaust gas. Thus, in the range of the rated output of the internal combustion engine, the exhaust gas temperature becomes so high that no after burning need be effected. In accordance with another feature of the present invention, the secondary air governing control arrangement automatically terminates an afterburning upon the exhaust gas temperatures reaching a predetermined maximum temperature, thereby safely preventing an overloading of the exhaust gas turbocharger.

According to yet another inventive feature of the present invention, an exhaust gas temperature dependent secondary air control arrangement may be provided with the fuel quantity delivered to the internal combustion engine being matched with the quantity of charged combustion air delivered to the engine since such a matching is decisive for the quantity of harmful components contained in the exhaust gas of the internal combustion engine and, therefore, the actual attainable temperature increases through afterburning.

In accordance with still a further feature of the present invention, a more exact and precise control of the secondary air flow may be realized by providing a control valve in a control line to the air flow valve, which control valve opens the control line only after a predetermined combustion air pressure has been reached.

Accordingly, it is an object of the present invention to provide a supercharged internal combustion engine which avoids by simple means the shortcomings and drawbacks encountered in the prior art.

A further object of the present invention resides in providing a supercharged internal combustion engine which increases and optimizes the output of the exhaust gas turbine at each operating condition of the engine.

Yet another object of the present invention resides in providing a supercharged internal combustion engine which minimizes the emission of harmful components in the exhaust gases.

A still further object of the present invention resides in providing a supercharged internal combustion engine which safely prevents an overloading of the exhaust gas turbocharger.

Another object of the present invention resides in providing a supercharged internal combustion engine which permits a precise and exact control of the flow of secondary air.

These and other objects, features and advantages of the present invention will become more apparent from the following description when taken in connection with the accompanying drawing which shows, for the purposes of illustration only, one embodiment in accordance with the present invention, and wherein:

The single FIGURE is a schematic representation of a supercharged internal combustion engine in accordance with the present invention.

Referring now to the single FIGURE of the drawing, an internal combustion, generally designated by the reference numeral 1, includes an exhaust gas supercharger, generally designated by the reference numeral 3, which comprises a charging blower 2 and an exhaust gas turbine 6 with combustion air being supplied to the internal combustion engine 1 from a charging blower 2 through a charging air line 4. A load regulating member, for example, a butterfly valve 5, is arranged in the charging air line 4 for controlling the flow of combustion air into the engine 1 in dependence upon the load demand.

The charging blower 2 is connected to the exhaust gas turbine 6 by way of a shaft, such that the flow of exhaust gases in the exhaust gas line 7 drives the exhaust gas turbine 6 and therewith the charging air blower 2.

A secondary air pump 9 is driven by the internal combustion engine 1 through, for example, a belt drive 8. The air pump 9 draws in fresh air from the atmosphere and supplies the air through a secondary air line 10 to a blow-off or change-over valve, generally designated by the reference number 11, arranged in a secondary air line 12 discharging into the exhaust gas line 7 at a position ahead or upstream of the exhaust gas turbine 6 as viewed in the direction of flow of the exhaust gases.

A control line 13 is provided for controlling the position of the valve 11. The line 13 branches off from the charging air line 4 at a position ahead or upstream of the butterfly valve 5 of the internal combustion engine 1 as viewed in the flow direction of the charging air. The control line 13 provides a supplying of a control pressure indicative of the pressure of the combustion air to the valve 11.

The valve 11 is fashioned as a double-sided, double-acting valve cone 15 which is connected to a pressure responsive element or membrane such as a diaphragm 14 with one valve cone or disk 16 controlling the flow of secondary air to the secondary air line 12 and the other valve cone 17 controlling the flow of secondary air to a secondary air line 18 which discharges into the atmosphere.

The valve 11 includes a housing having arranged therein a partition wall 19 dividing the housing into a first chamber accommodating the pressure responsive element 14 and a second chamber accommodating the valve cones or disks 16,17 with the partition wall 19 forming a part of the secondary air line 18. A compression spring 20 is arranged in the first chamber between the pressure responsive element 14 and the partition wall 19 with the spring force of the spring 20 biasing the valve cone 17 into a closed position during specific operating conditions of the internal combustion engine 1.

The supercharged internal combustion engine operates in the following manner.

Upon a starting of the internal combustion engine 1, the combustion air pressure in the charging air line 4 is relatively small so that the charging air pressure supplied to the valve 11 through the control line 13 is not sufficient to open the secondary air line against the spring pressure of the compression spring 20. Consequently, in this operating condition, the entire secondary air drawn in by the secondary air pump 9 is supplied to the exhaust gas line 7 by way of the secondary air line 12. The oxygen contained in the secondary air causes an afterburning of the exhaust gas in the exhaust gas line 7 whereby the exhaust temperature is increased.

As the pressure of the combustion air continues to increase through the continued operation of the internal combustion engine, the pressure in the control line 13 increases accordingly, thereby increasing the pressure acting upon the pressure responsive element 14 resulting in a displacement of the pressure responsive element 14 and valve 15, thereby regulating the flow of secondary air between the secondary air lines 12, 18. Since the lines representing the characteristics of constant exhaust temperature in a characteristic graph of a supercharged internal combustion engine are similar to the line of constant charging pressure, the valve 11 is designed by a corresponding dimensioning of the compression spring 20 so that in the vicinity of the rated output operation of the internal combustion engine, the combustion air pressure acting upon the pressure responsive element 14 displaces such element to a maximum extent against the spring force of the spring 20 whereby the secondary air line 12 to the exhaust gas line 7 is sealed by the valve cone 16 and the valve cone 17 is unseated, thereby opening the secondary air line 18 so as to discharge the secondary air into the atmosphere. As a result of the displacement of the element 14 and valve 11, no further exhaust gas afterburning is effected and the output of the exhaust gas turbocharger 3 remains essentially constant.

While I have shown and described only one embodiment in accordance with the present invention, it is understood that the same is not limited thereto, but is susceptible of numerous changes and modifications as known to those skilled in the art, and I therefor do not wish to be limited to the details shown and described herein, but intend to cover all such changes and modifications as are encompassed by the scope of the appended claims.

I claim:

1. A supercharged internal combustion engine comprising:

an exhaust gas turbocharger means having an air charging blower means and an exhaust gas turbine means, charging air line means interposed between said air charging blower means and the engine for supplying combustion air to the engine, exhaust gas line means interposed between said engine and said exhaust gas turbine means for supplying exhaust gases from said engine to drive said exhaust gas turbine means, secondary air pump means for generating a supply of secondary air, secondary air line means interposed between said secondary air pump means and said exhaust gas line means for communicating said secondary air to said exhaust gas line means at a position upstream of said exhaust gas turbine means, secondary air control valve means including a movable pressure responsive valve actuator, said valve means being disposed in said secondary air line means for controlling the supply of secondary air to said exhaust gas line means as a function of the position of said valve actuator, and control air line means interposed between said charging air line means and said valve means for communicating the pressure in said charging air line means to said valve actuator so as to control the position of said valve actuator directly as a function of the charging pressure in said charging air line means.

2. An engine according to claim 1, wherein said valve means includes means for selectively venting portions of the secondary air flow in said secondary air line to atmosphere in response to the position of said valve actuator.

3. An engine according to claim 1, wherein said valve means includes means for selectively supplying the secondary air in said secondary air line means to the atmosphere and to the exhaust gas line means in dependence on the position of said valve actuator.

4. An engine according to claim 1, characterized in that the secondary air line means includes a first air line means communicating the valve means with the air pump means, a second air line means communicating the valve means with the exhaust gas line means, and a third air line means communicating the valve means with the atmosphere, and in that the valve means includes a housing means, said control valve actuator being arranged in said housing means, a double-acting valve connected to said control valve actuator so as to be displaceable therewith to selectively communicate the air pump means with the exhaust gas line means and the atmosphere in response to pressure changes in the combustion air pressure in said charging air line means, and a means for normally biasing said double-acting valve into a first position opening the second air line means so as to supply secondary air to the exhaust gas line means, said double-acting valve means being displaceable to a second position in response to a predetermined increase in the combustion air pressure acting upon the control valve actuator so as to close the second air line means and open the third air line means thereby discharging the secondary air to the atmosphere.

5. An engine according to claim 4, characterized in that the housing means includes a partition wall means dividing said housing means into a first chamber accommodating the control valve actuator and a second chamber accommodating the double-acting valve, said first, second and third air line means each communicating with said second chamber, that said biasing means is arranged between said partition wall means and the pressure responsive element, and in that said partition wall means forms a portion of said third air line means.

6. An engine according to claim 5, characterized in that means are provided for selectively controlling the operation of the valve means such that said valve means is operative only upon the pressure of the combustion air reaching a predetermined value.

7. An engine according to claim 1, characterized in that the valve means includes a housing means, said control valve actuator being arranged in said housing means, a double-acting valve connected to said control valve actuator so as to be displaceable therewith to selectively communicate the air pump means with the exhaust gas line means and the atmosphere in response to pressure changes in the combustion air pressure, and a means arranged in said housing means for normally biasing the double-acting valve into a first position supplying secondary air to the exhaust gas line means, said double-acting valve being displaced to a second position in response to a predetermined increase in the combustion air pressure acting upon the control valve actuator so as to terminate the supply of secondary air to the exhaust gas line means and initiate the supply of secondary air to the atmosphere.

8. An engine according to claim 7, characterized in that means are provided for selectively controlling the operation of the valve means such that the valve means is operative only upon the pressure of the combustion air reaching a predetermined value.

9. An engine according to claim 8, characterized in that said means for selectively controlling the valve means includes said control air line means arranged between the air charging blower means and the valve means, and a butterfly valve arranged in said control air line means.

10. An engine according to claim 1, characterized in that means are provided for selectively controlling the operation of the valve means such that said valve means is operative only upon the pressure of the combustion air reaching a predetermined value.

11. A supercharged internal combustion engine including an exhaust gas turbocharger means comprising an air charging blower means for supplying combustion air to the engine and an exhaust gas turbine means, and a secondary pump means for providing a supply of secondary air for afterburning of exhaust gases of the engine, characterized in that a valve means is provided for regulating the supply of secondary air, said valve means being arranged between the secondary pump means and the exhaust gas turbine means and being responsive to pressure of the combustion air for selectively supplying the secondary air to at least one of the gas turbine means and the atmosphere in dependence upon the combustion air pressure, characterized in that a charging air line means is interposed between the charging blower means and the engine, an exhaust gas line means is interposed between the engine and the exhaust gas turbine means and a secondary air line means is interposed between the secondary air pump means and the exhaust gas line means, said secondary air line means communicating with said exhaust gas line means at a position upstream of the exhaust gas turbine means as viewed in the flow direction of the exhaust gases, and in that said valve means is arranged in said secondary air line means between the air pump means and the exhaust gas line means, characterized in that means are provided for drivingly connecting the exhaust gas turbine means with the charging air blower means, characterized in that the secondary air line means includes a first air line means communicating the valve means with the air pump means, a second air line means communicating the valve means with the exhaust gas line means, and a third air line means communicating the valve means with the atmosphere, and in that the valve means includes a housing means, a pressure responsive means arranged in said housing means, a double-acting valve connected to said pressure responsive means so as to be displaceable therewith to selectively communicate the air pump means with the exhaust gas turbine means and the atmosphere in response to pressure changes in the combustion air pressure, and a means for normally biasing said double-acting valve into a first position opening the second air line means so as to supply secondary air to the exhaust gas turbine means, said double-acting valve means being displaceable to a second position in response to a predetermined increase in the combustion air pressure acting upon the pressure responsive element so as to close the second air line means and open the third air line means thereby discharging the secondary air to the atmosphere, characterized in that the housing means includes a partition wall means dividing said housing means into a first chamber accommodating the pressure responsive element and a second chamber accommodating the double-acting valve, said first, second and third air line means each communicating with said second chamber, said biasing means is arranged between said partition wall means and the pressure responsive element, and in that said partition wall means forms a portion of said third air line means, characterized in that means are provided for selectively controlling the operation of the valve means such that said valve means is operative only upon the pressure of the combustion air reaching a predetermined value, characterized in that a control air line means is arranged between the charging air line means and the first chamber of said valve means, and in that said means for selectively controlling the valve means includes a butterfly valve arranged in said control air line means.

* * * * *